April 9, 1946.　　　W. SPRINGER　　　2,398,055
ALTIMETER
Filed May 20, 1939　　　2 Sheets-Sheet 1
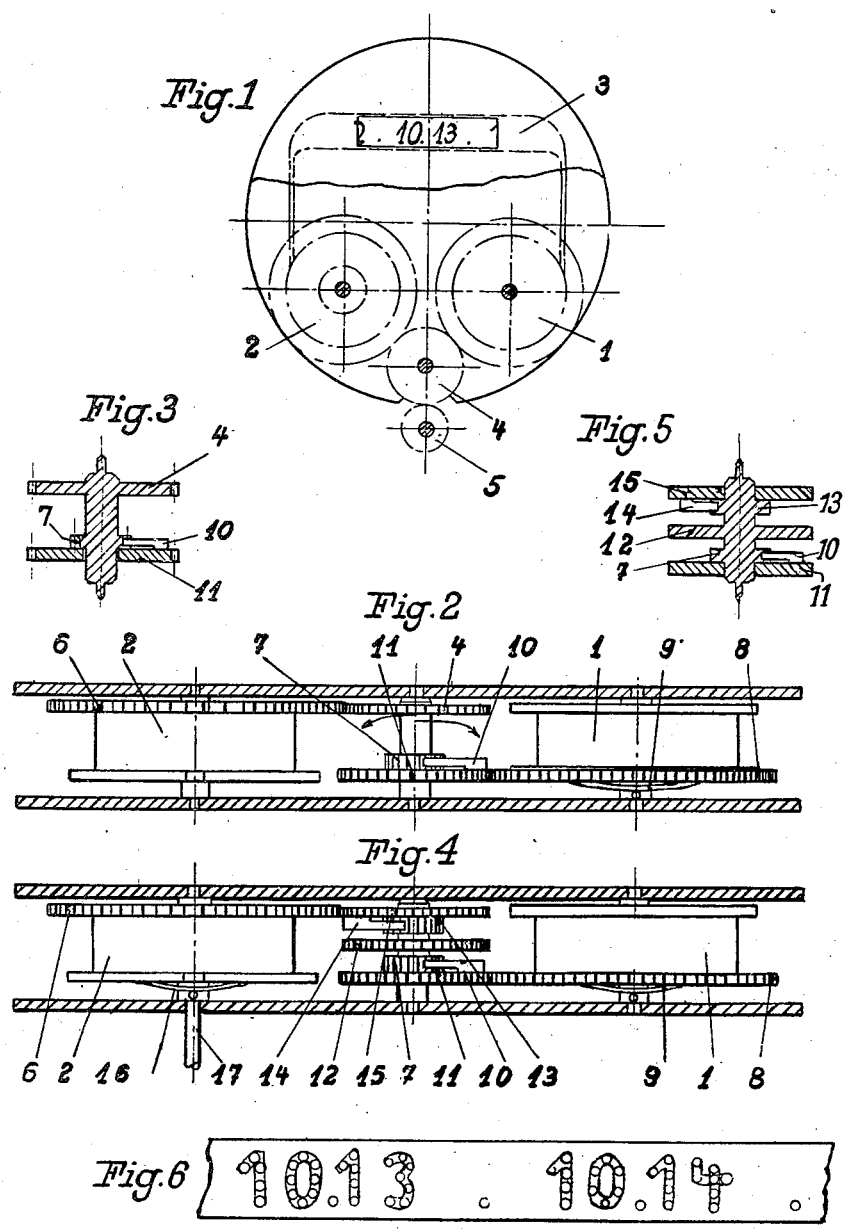
Inventor:
Walter Springer
By A. D. Adams
Attorney Inventor:
Walter Springer
By [signature]
Attorney.

Patented Apr. 9, 1946

2,398,055

UNITED STATES PATENT OFFICE 2,398,055

ALTIMETER

Walter Springer, Berlin-Steglitz, Germany;
vested in the Alien Property Custodian Application May 20, 1939, Serial No. 274,851
In Germany May 23, 1938

6 Claims. (Cl. 73—387)

The present invention relates to improvements in altimeters, which, as is known, must be provided with a device for correcting the reading thereof in accordance with the barometer pressure existing at any moment. Before reading the instrument a second reference pressure indicator has to be set to the pressure actually existing at ground level, in order that the reading on the altitude scale shall be free of error.

Hitherto the necessary correcting arrangement has generally been constructed with a second scale graduated in millimetres of mercury or millibars and connected with the meter mechanism, which is disposed behind the dial and is read off against a mark through an aperture in the dial. This scale is sufficient for a comparatively small range of pressure variation, such range being characterised roughly by the maximum and minimum barometer levels. But a larger range is becoming increasingly necessary, on account of the fact that landing fields at considerable altitudes, up to say 2500 m., now come into question. For such altitudes it is necessary for the correction range to be extended considerably, and the difficulty then arises of providing a reference scale of length corresponding to the large pressure range. In addition to being governed by the pressure limits, the length of the scale is also determined by the precision with which the pressure can be adjusted. In this connection one cannot go below a certain minimum degree of accuracy of reading, for example one graduation per millibar, and the spacing of the graduations must be large enough to enable say half a millibar to be estimated with reasonable accuracy. The difficulty here arises that altitude and pressure are connected to one another by a logarithmic function so that the scale of the reference indicator is compressed towards one end.

The invention enables both the range and the accuracy of reading to be increased as much as is desired. The main new principle upon which the invention is based consists in using a thin tape as a carrier for the reference pressure scale. This tape is wound onto two coiling elements or spools, between which it can be wound to and fro, running from one onto the other and vice versa, a short free portion between the spools running past the reading window. Since a tape for example 4 to 6 m. in length when wound up only forms a small reel a few centimetres in diameter, the tape can be conveniently installed in the case of the altimeter. With a length of some metres available for the scale, it is possible for the accuracy of reading even with a range of 850–1050 millibars, to amount to $\frac{1}{10}$ of a millibar at the most graduated part of the scale. In addition, owing to the positive logarithmic connection between the two scales, a strip has particular advantages as compared with those known arrangements which use for the reference pressure a counter mechanism that advances step by step in decimals. In such a case an element has to be provided between the reference indicator and the altitude indicator which evolves the logarithmic relationship. Such an evolving device however, can only be accurate to a very limited degree. Relatively high accuracy for example, $\frac{1}{10}-\frac{2}{10}$ millibar, cannot be achieved by such an arrangement, which has to solve the barometric altitude formula graphically. The tape arrangement is entirely free of such an evolving element with its consequent limited accuracy, since as a result of the continuous scale carrier the graduations for each fraction can be provided exactly at the theoretically correct places. The tape itself consists preferably of metal, for example stainless steel, to provide maximum safety against tearing or breakage and great constancy of length.

In carrying the basic principle of the invention into constructive effect the particular problem has to be solved of ensuring that each point of the tape always corresponds to the same position of the meter mechanism, independently of the direction of motion. This requirement can be met, for example, as in Figure 8, by perforating the tape and by causing the gear wheel effecting the displacement of the meter mechanism simultaneously to drive the toothed wheel engaging in the perforations, but Figures 1 to 5 of the accompanying drawings illustrate embodiments of the invention in which such perforation is unnecessary, the requisite synchronisation between the positions of the tape and the meter mechanism being achieved by a simple, durable and, in particular, absolutely reliable arrangement.

In order that the invention may be clearly understood and readily carried into practice, reference will now be made to the accompanying drawings, in which the invention is illustrated by way of example and in which:

Figure 1 is a diagrammatic front view of an altimeter according to the present invention.

Figure 2 is a horizontal cross-section illustrating one method of driving the reference pressure tape, the view being taken from beneath, so that the free part of the tape is on the far side of the plane of the drawing, and Figure 3 is a sectional view illustrating a detail of Figure 2.

Figure 4 is a view, similar to Figure 2, of an alternative embodiment of the invention, of which Figure 5 is a sectional view illustrating a detail.

Figure 6 is a front view illustrating a form of tape for use in altimeters according to the invention.

Figure 7:
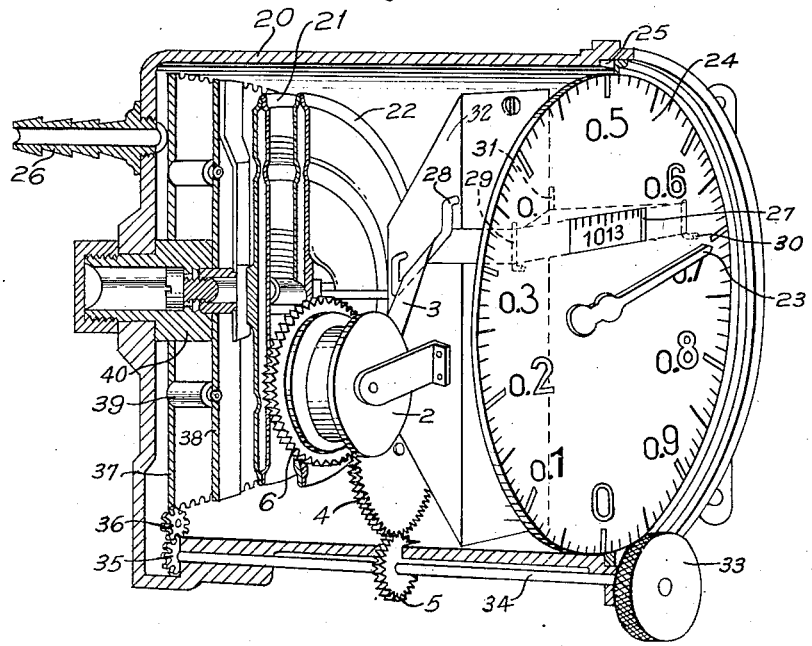
Figure 7 is a perspective view partly in section of an altimeter.

Referring to Figure 1, 1 and 2 are the two spools, and 3 is the tape, preferably of stainless steel. The spools are driven by means of the gear wheel 4 and the externally operated gear wheel 5. The meter mechanism is driven either from the spindle of the gear 5 (Figures 2 and 3) or from the spindle of the spool 2 (Figures 4 and 5). The gear 4 meshes with gear 6, which is rigidly connected to spool 2, and on rotation of gear 4 in the direction of the left-hand arrow (Figure 2) the tape is wound onto spool 2. Spool 1 is not rigidly connected with the gear wheel 8, but through the intermediary of a spring washer 9 which latter bears against and exerts pressure on the side of spool 1, so that the tape being withdrawn by spool 2 is kept taut by friction. When gear 4 is rotated in the direction of the right-hand arrow (Figure 2) the tape is unwound from spool 2, but now spool 1 is also driven in the direction for winding up the tape coming from spool 2. This is effected by means of a ratchet wheel 7, fixed on the same spindle as gear 4 (Figure 3) which carries along a pawl 10 of a further gear wheel 11 mounted loosely on the same spindle and which meshes with gear 8; and as mentioned above, the latter is frictionally coupled to spool 1. The spools have different diameters, that of spool 1 being equal to the diameter of spool 2 with the tape wound thereon. As a result the length of tape that can be wound up by the draft of spool 1 is greater than the length of tape positively unwound by spool 2. The difference between draft and feed is compensated by slipping of the frictional clutch between spool 1 and gear 8.

The important point in this connection is that the length of tape moved in both directions is governed by the rotation of one and the same spool 2 only. Since spool 2 is rigidly coupled to the mechanism drive by way of gear 4, this means that the same position of the mechanism always tallies with the same point of the strip in both directions of rotation. Moreover, no error is possible due to the increasing diameter of the spool as the tape is wound thereon, since the instrument is calibrated with this dependency taken into account. Calibration is actually effected when construction of the instrument has been completed by marking on the reference scale the exact millibar value based on the altitude formula for each value of the altitude scale. In this way the effect of the changing spool diameter is completely eliminated, since the calibration of each point of the tape is carried out in conjunction with the positive common displacement of the two scales that is to say including the alteration in diameter that takes place.

In Figures 4 and 5 an alternative construction is illustrated. In Figure 4 the gear 12 is the one that is driven by the manually operated wheel 5. It is carried firmly on a spindle with gears 7 and 13 (Figure 5). Similarly to gear 7, the gear 13 has ratchet teeth so that the gear 15 can be clutched in one direction of rotation by means of the pawl 14. The teeth of gear 7 and the position of pawl 10 are opposite to those of gear 13 and pawl 14. Either one or the other of the two gears 15, 11 is entrained in each direction of rotation. The gear 15 meshes with gear 6 and gear 11 with gear 8. The gear 8 is frictionally coupled to spool 1 and gear 6 is frictionally coupled to spool 2. Spool 2 is connected to the gear 6 in the same manner as spool 1 by a spring washer 16. In the construction according to Figures 4 and 5 the meter mechanism is driven from one of the two spool spindles, such for example as the spindle 17 of spool 2, or from a gear wheel that is governed by one of these spools.

In the constructions illustrated by way of example the spool spindles are parallel to the longitudinal axis of the case, and consequently the tape has to be bent in a right angle to run past the window with its face parallel to the front surface, but of course it is quite possible to arrange the spools so that their axes are perpendicular to the axis of the case, in which the bending of the tape can be avoided.

The indicia can be impressed in the tape. To ensure facility of reading, even in the dark, the figures may conveniently be made by perforations (Figure 6), when an area of luminous colour the size of the whole reading window is provided behind the tape.

Referring now to Figure 7 the altimeter illustrated is provided with the reference pressure indicating tape according to the invention. In the casing 20 two aneroid capsules 21, 22 are arranged, said capsules transmitting their deflections in known manner to a pointer 23 travelling over a calibrated scale 24. This casing 20 is provided with an opening in front, in which the dial 24 is fixedly mounted by means of a screw thread ring 25. At the back wall of the casing 20 there is a connecting piece 26 serving to conduct the static pressure. In the dial 24 there is a slit 27 through which a tape 3 is visible which is graduated in millibar values and according to the invention serves to indicate the reference pressure. The tape 3 is wound on two reels 1 and 2 of which the one (2) is shown in the drawings, the tape being wound at will on to one or the other of these reels. The tape 3 is controlled by means of guiding members 28, 29, 30 and 31 which in the same way as the reels 1 and 2 are secured on a support 32 fixedly mounted in the casing.

The drive of the reels 1 and 2 is effected from a turning button 33 arranged below the dial 24. At the actuation of this turning button a gear wheel 5 is rotated via an axle 34, said gear wheel meshing with another gear wheel 4 in turn engaging gear wheel 6 (see Fig. 2). Gear wheels 6 and 8 are connected with the reels 1 and 2 respectively by means of friction couplings so that upon actuation of the turning button a certain length of tape is wound off one reel onto the other. For example, counterclockwise rotation of axle 34 (Fig. 1) positively rotates spool 2 in a counterclockwise direction through gear train 5, 4 and 6 and thereby exerts tension upon tape 3 to unwind the latter from spool 1 onto spool 2. Clockwise rotation of axle 34 positively rotates spool 1 in a clockwise direction through driving connection 5, 4, 7, 10, 11 and 8 to thereby wind the tape 3 onto spool 1.

As a millibar adjustment must be accompanied by a corresponding adjustment of the altimeter relative to the dial since the millibar indication alone is of no use to the pilot, a further gear wheel 35 is arranged on the axle 34 for effecting this adjustment. This gear wheel is connected with a spur wheel 37 via a gear wheel 36, the spur wheel being on the other hand connected with the capsules 21, 22 by means of the pin 39 and a partition wall 38, so that the turning of the button in addition to the millibar adjustment effects a corresponding movement of the pointer 23 relative to the dial 24. The spur wheel 37 and the partition 38 are supported at the back wall of the casing 20 by means of a bushing 40.

The adjustment of the pointer 23 relative to the dial 24 by turning the measuring capsule together with the transmission system for the transmission of the deflection are known per se (U. S. Patent No. 1,741,702). Instead of effecting the adjustment in this manner it is also possible to insert in the transmission gear between the capsule and pointer a compensation gear likewise known per se (U. S. Patent No. 1,933,195). Consequently, the invention is not limited to the possibility of adjustment of the pointer in relation to the dial but may be used in all altimeters designed to adjust the altitude indication in accordance with the atmospheric pressure prevailing on the ground and to show this indication by means of a reference pressure indicating element.

Figure 8:
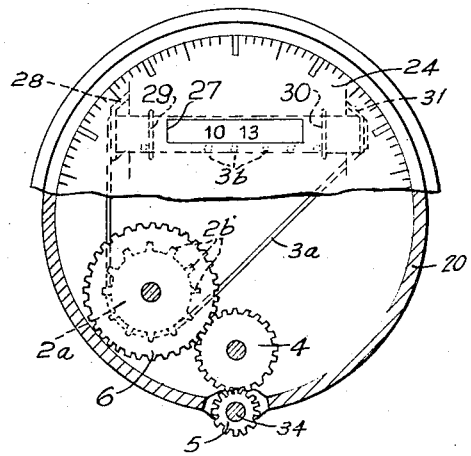
Figure 8 is a sectional detail view wherein the tape is positively driven respectively in opposite directions by a toothed wheel engaging perforations in the tape.

As heretofore stated the tape may be driven by a toothed wheel engaging perforations in the tape. In Figure 8 this type of tape drive is shown in detail. It is here noted that an endless tape 3a having spaced perforations 3b therein is advanced by means of teeth 2b projecting from wheel 2a, said teeth penetrating the perforations 3b. Tape 3a is guided past the window 27 by means of members 28, 29, 30 and 31 previously described. The driving means for the wheel 2a comprises members 34, 5, 4 and 6 and may be arranged substantially in the same positions as the corresponding elements in the left hand portions of Figures 1 and 2.

I claim:

1. In an altimeter for aircraft having settable pointer means relative to scale means, the combination of setting means for changing the indication of said pointer means corresponding to changes in ground level pressure and a tape having a consecutive graduation in pressure units functionally related to said scale means and being shiftable by said setting means for indicating the ground level and pressure corresponding to which the indication of said pointer means has been changed.

2. In an altimeter having altitude indicator mechanism which is adjustably settable in accordance with a reference pressure, a reference pressure indicating device comprising a tape calibrated to indicate the reference pressure as a logarithmic function of an altitude scale of the altimeter, a pair of spools, and means for winding said tape from one spool onto the other and vice versa in synchronism with the setting of the altitude indicator mechanism.

3. In an altimeter, a reference pressure indicating device comprising a pair of spools, a tape bearing a reference pressure scale, means for unwinding said tape from one of said spools and for winding it onto the other and vice versa comprising a spindle, a pair of ratchet wheels fixed on said spindle, a pair of toothed wheels each carrying a pawl for engagement with its respective ratchet wheel and mounted loosely on said spindle, each toothed wheel being driven, one at a time, but in a direction opposite to that of the other toothed wheel, by one of said pawls on rotation of said spindle in one direction or the other, gear wheels adapted for cooperation with said toothed wheels, and frictional clutch means between said gear wheels and the spools.

4. In an altimeter having an altitude indicator mechanism adjustably settable in accordance with a reference pressure, a reference pressure indicating device comprising a perforated tape calibrated to indicate the reference pressure, a toothed wheel having teeth for engaging in the perforations of the tape to impart motion thereto, and means operatively connecting said toothed wheel with the adjustably settable altitude indicator mechanism of the altimeter.

5. In an altimeter having altitude indicator mechanism adjustably settable in accordance with a reference pressure; a reference pressure indicating device comprising a tape calibrated to indicate the reference pressure; a first and a second spool; means drivably connected to said adjustably settable altitude indicator mechanism for unwinding the tape from said first spool and for winding it onto the second spool, said means including a driving spindle for driving said second spool and the altitude indicator mechanism, and a gear wheel for coupling said spindle positively to said second spool; and means driven by at least a portion of said first-named means for unwinding the tape from said second spool and for winding it on the first spool, said last driven means including a second gear wheel, pawl and ratchet wheel mechanism adapted to drive said second gear wheel in one direction of rotation only of said spindle, and a friction clutch between said latter gear wheel and said first spool.

6. In an altimeter having an altitude indicator mechanism adjustably settable in accordance with a reference pressure; a reference pressure indicating device comprising a pair of spools; a tape bearing a reference pressure scale; and means drivably connected to said adjustably settable altitude indicator mechanism for unwinding said tape from one of said spools and for winding it onto the other and vice versa, said means comprising a spindle, a pair of ratchet wheels fixed on said spindle, a pair of toothed wheels respectively carrying oppositely directed pawls for engagement with respective ratchet wheels mounted loosely on said spindle, each toothed wheel being driven, one at a time, but in a direction opposite to that of the other toothed wheel by one of said pawls on rotation of said spindle in one direction or the other, a gear wheel adapted to cooperate with each of said toothed wheels, and frictional clutch means between each of said gear wheels and the respective spool.

WALTER SPRINGER.